United States Patent
Gaa et al.

[11] Patent Number: 5,919,933
[45] Date of Patent: Jul. 6, 1999

[54] LIGHT STABILIZERS BASED ON STERICALLY HINDERED AMINES

[75] Inventors: Karl Gaa, Burtenbach; Matthias Zäh, Gersthofen; Mathias Mehrer, Gablingen; Gerhard Pfahler, Augsburg; Thomas Stährfeldt, Neusäss, all of Germany

[73] Assignee: Clariant GmbH, Frankfurt, Germany

[21] Appl. No.: 08/903,017

[22] Filed: Jul. 31, 1997

[30] Foreign Application Priority Data

Aug. 2, 1996 [DE] Germany ............... 196 31 244

[51] Int. Cl.$^6$ ............... C07D 211/40; C07D 211/56
[52] U.S. Cl. ............... 546/222; 546/224; 546/190
[58] Field of Search ............... 546/222, 224, 546/190

[56] References Cited

U.S. PATENT DOCUMENTS

| | | | |
|---|---|---|---|
| 4,314,933 | 2/1982 | Berner | 260/45.75 |
| 5,739,135 | 4/1998 | Biller et al. | 514/252 |

FOREIGN PATENT DOCUMENTS

| | | |
|---|---|---|
| 0389427 | 4/1994 | European Pat. Off. |
| 4327297 | 2/1994 | Germany |
| WO 96/33156 | 10/1996 | WIPO |
| WO 97/42171 | 11/1997 | WIPO |

OTHER PUBLICATIONS

European Search Report.
XP002037628 Ligner G. & Malik J.: "How to increase HALS persistence in polyolefins without jeopardising stabilization efficiency" ADDCON 96: Worldwide Addit. Polymer Modif. Conference, Book PAP., Paper 7, May 21, 1996, pp. 1–8.

XP000691399 Malik J. et al.: "Polymer bound HALS—expectations and possibilities" Die Angewandte Makromolekulare Chemie, Bd. 247, May 1997, pp. 147–161 & Paper Presentation: Eighteenth Annual International Conference on Advances in the Stabilization and Degradation of Polymers, Jun. 19–Jun. 21, 1966, Luzern, Switzeralnd.

XP000635466 Anonymous: "Polymer Stabilizers" Research Disclosure, Bd. 389, Nr. 38910, Sep. 1996, pp. 541–545.

XP000533985 Step E.N. et al.: "Model Studies on the Mechanism of Hals Stabilization" Die Angewandte Makromolekulare Chemie, Bd. 232, Oct. 1, 1995, pp. 65–83.

*Primary Examiner*—Alan L. Rotman
*Assistant Examiner*—Charanjit S. Aulakh
*Attorney, Agent, or Firm*—Susan S. Jackson

[57] ABSTRACT

The present invention relates to novel UV stabilizers of the formula (I)

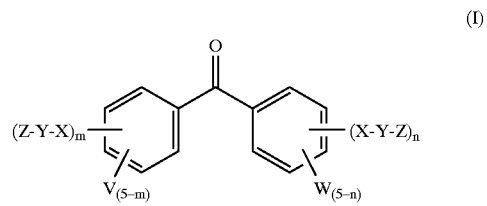

where the substituents are as defined in the description. These compounds are highly suitable for stabilizing organic material, such as plastics, surface coatings, paints and oils, against the action of light, radiation, oxygen and heat.

10 Claims, No Drawings

LIGHT STABILIZERS BASED ON STERICALLY HINDERED AMINES

It is known that organic materials are damaged by high-energy radiation, heat or oxygen. The surface layer of organic materials is usually exposed to these damaging effects to a particular extent. The problem is particularly evident in thin articles, such as fibers, tapes and films, but also results in damage (for example embrittlement) in thicker-walled articles, particularly to the surface layer.

Many publications have already described compounds for stabilizing organic materials. Some of them relate to 2,2,6,6-tetraalkylpiperidine compounds. These stabilizers must be present in sufficient concentration, in particular in the surface layer of the organic material, in order to provide effective protection. The low-molecular-weight representatives from the 2,2,6,6-tetraalkylpiperidine class of substances have the advantage of migrating rapidly into the surface layer and developing their protective action therein. However, they have the severe disadvantage of being excessively volatile and readily extractable from the organic material. Although the relatively high-molecular-weight representatives from this class of substances are not so readily extractable, they migrate significantly more slowly. In industry, this problem is countered by using a mixture of low-molecular-weight (fast-migrating) and high-molecular-weight (slow-migrating) stabilizers.

DE-A-4 327 297 discloses 2,2,6,6-tetraalkylpiperidine-derived compounds which are converted into an extraction-stable form after exposure to ultra-violet light. The component which reduces the migration rate in DE-A-4 327 297 is a derivative of cinnamic acid. It is responsible for the stabilizer forming a covalent bond to the organic material.

EP-A-389 427 describes compounds which contain a 2,2,6,6-tetraalkylpiperidine derivative and a benzophenone simultaneously in the same molecule. However, the only benzophenones disclosed therein are those which contain an a-hydroxyl group and thus act as UV absorbers.

Surprisingly, it has been found that suitably substituted representatives of benzophenone (a) migrate "rapidly" in organic materials and thus reach the surface layer of the material quickly, (b) are converted into a less-extractable or inextractable form after exposure to light having a wavelength of 280–700 nm (preferably after exposure to light having a wavelength of 300–400 nm), and (c) even in this new, inextractable form continue to provide effective protection of organic materials against the abovementioned damaging effects of ultra-violet light.

The invention thus relates to UV stabilizers of the formula (I)

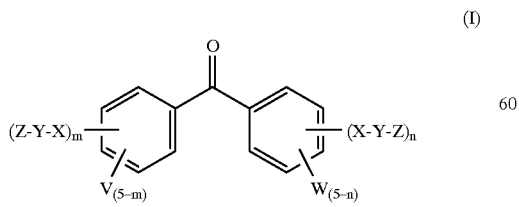

(I)

in which the substituent in the a-position to the carbonyl group on the aromatic ring is not OH, m and n, independently of one another, are 0, 1 or 2, V and W, independently of one another, are H, Hal, $NO_2$, OH, $OR^1$, CN, $SR^1$, $C_1$–$C_{18}$-alkyl, preferably $C_1$–$C_{10}$-alkyl, in particular $C_1$–$C_4$-alkyl, $C_3$–$C_{10}$-cycloalkyl, preferably $C_5$–$C_6$-cycloalkyl, $C_6$–$C_{14}$-aryl or $C_7$–$C_{10}$-arylalkyl, each of which is unsubstituted or substituted by OH, $OR^1$, Hal or $NR^1R^2$, a heteroaromatic radical having 5–15 carbon atoms, preferably 6–10 carbon atoms, $NR^1R^2$ or $COOR^1$, $R^1$ and $R^2$ are H, $C_1$–$C_{18}$-alkyl, preferably $C_1$–$C_{10}$-alkyl, in particular $C_1$–$C_4$-alkyl, $C_3$–$C_{10}$-cycloalkyl, preferably $C_5$–$C_6$-cycloalkyl, $C_6$–$C_{14}$-aryl or $C_7$–$C_{10}$-arylalkyl, each of which is unsubstituted or substituted by OH, $OR^1$ or Hal, or a heteroaromatic radical having 5–15 carbon atoms, preferably 6–10 carbon atoms, X is a divalent radical —O—, —S—, or —C(O)—, Y, where X=O or S, is —$CH_2$—C(O)—, —C(O)—, —C(O)—C(O)—, —$CH_2$—$CHR^1$—, —($CH_2$—$CH_2$—O$)_n$— (where n=1–8), preferably —C(O)— or —$CH_2$—C(O)—, or a

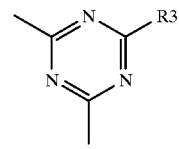

radical, where $R^3$ is $NR^1R^2$, $OR^1$, halogen or Z,

Y, where X=—C(O)—, is a direct bond to Z,

Z is one of the following radicals:

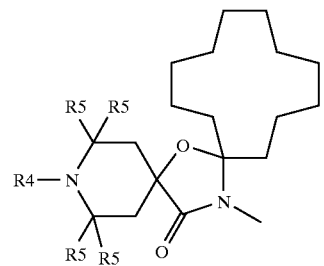

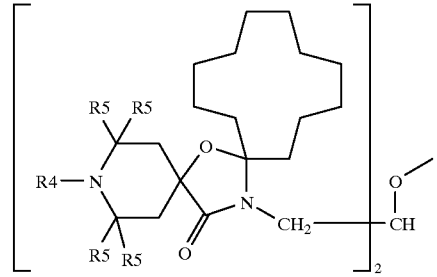

-continued

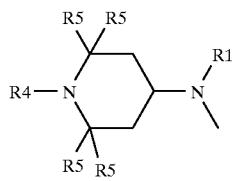
$R_C$

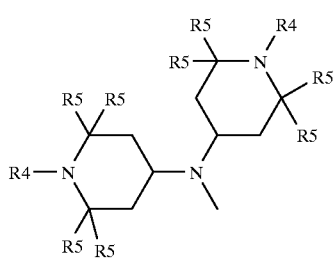
$R_D$

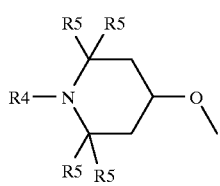
$R_E$

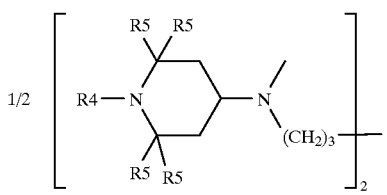
$R_F$ preferably $R_C$ or $R_E$,
in which
$R^4$ is hydrogen, $C_1$–$C_{20}$-alkyl, preferably $C_1$–$C_{10}$-alkyl, in particular $C_1$–$C_5$-alkyl, an oxygen radical, OH, NO, $CH_2CN$, $C_6$–$C_{14}$-aryl or $C_7$–$C_{10}$-arylalkyl, each of which is unsubstituted or substituted by OH, $OR^1$, Hal or $NR^1R^2$, allyl, $C_1$–$C_{30}$-alkoxy, preferably $C_1$–$C_{10}$-alkoxy, in particular $C_1$–$C_5$-alkoxy, $C_5$–$C_{12}$-cycloalkoxy, preferably $C_6$–$C_9$-cycloalkoxy, $C_3$–$C_{10}$-alkenyl, preferably $C_4$–$C_8$-alkenyl, $C_3$–$C_6$-alkynyl, $C_1$–$C_{10}$-acyl, preferably $C_1$–$C_5$-acyl or halogen,
$R^5$ is hydrogen or $C_1$–$C_4$-alkyl, preferably methyl.

Very highly suitable stabilizers are also those in which the substituent in the a-position to the carbonyl group on the aromatic ring is not OH,
m and n, independently of one another, are 0, 1 or 2,
V and W, independently of one another, are H, $NO_2$, OH, $C_1$–$C_{10}$-alkyl, $C_5$–$C_6$-cycloalkyl, $C_6$–$C_{14}$-aryl or $C_7$–$C_{10}$-arylalkyl, each of which is unsubstituted or substituted by OH or $NR^1R^2$, a heteroaromatic radical having 6–10 carbon atoms, $NR^1R^2$ or $COOR^1$,
$R^1$ and $R^2$ are H, $C_1$–$C_{10}$-alkyl, $C_5$–$C_6$-cycloalkyl, $C_6$–$C_{14}$-aryl or $C_7$–$C_{10}$-arylalkyl, each of which is unsubstituted or substituted by OH, or a heteroaromatic radical having 6–10 carbon atoms, X, is a divalent radical —O— or —C(O)—,
Y, where X=O, is —$CH_2$—C(O)—, —C(O)— or —$CH_2$—$CHR^1$—,
Z is the radical $R_A$, $R_C$, $R_D$ or $R_E$, in which
$R^4$ is hydrogen, $C_1$–$C_{10}$-alkyl, an oxygen radical, OH, NO, $C_6$–$C_{14}$-aryl or $C_7$–$C_{10}$-arylalkyl, each of which is unsubstituted or substituted by OH or $NR^1R^2$, allyl, $C_1$–$C_{10}$-alkyloxy, $C_6$–$C_9$-cycloalkyloxy, $C_4$–$C_8$-alkenyl, $C_3$–$C_6$-alkynyl, $C_1$–$C_5$-acyl or halogen, and
$R^5$ is hydrogen or $C_1$–$C_4$-alkyl.

Particularly suitable UV stabilizers are compounds of the formula I in which the subsituent in the α-position to the carbonyl group on the aromatic ring is not OH,
m and n, independently of one another, are 0, 1 or 2,
V and W, independently of one another, are H, $NO_2$, $C_1$–$C_4$-alkyl, $NR^1R^2$ or $COOR^1$,
$R^1$ and $R^2$ are H, $C_1$–$C_4$-alkyl, $C_6$–$C_{14}$-aryl or $C_7$–$C_{10}$-arylalkyl, each of which is unsubstituted or substituted by OH,
X is a divalent radical —O— or —C(O)—,
Y where X=—O—, is —C(O)— or $CH_2$—C(O)—,
Y where X=—C(O)— is a direct bond to Z,
Z is a radical of the formula $R_C$ or $R_E$, in which
$R^4$ is hydrogen, OH, NO, $C_1$–$C_5$-alkyl, $C_1$–$C_5$-alkoxy, or $C_1$–$C_5$-acyl, and
$R^5$ is methyl.

The invention also relates to the preparation of these compounds (I). The novel compounds can be built up in basically two different ways.

Firstly, the novel compounds can be built up by converting a benzophenone (II) into a reactive molecule (III) using one or more equivalents of a suitable reagent R:

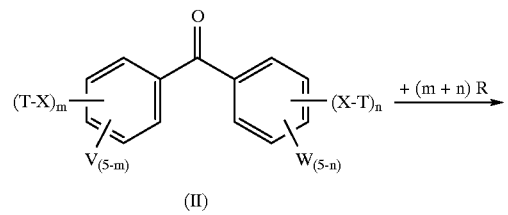

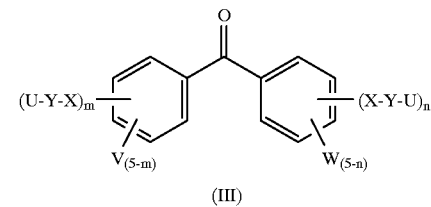

where T, in the case where X=—O— or —S—, is hydrogen, and in the case where X=—C(O)—, is $OR^1$, $NR^1R^2$, —O—C(O)—$R^1$ or OH, R,
in the case where X-T is OH or SH, is Hal—$CH_2$—C(O)—U, U—C(O)—U, U—C(O)—C—(O)—U, ethylene oxide Hal—$CH_2$—$CHR^1$—Hal,

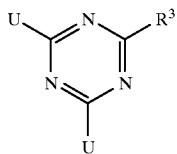

where $R^3$ is $NR^1R^2$, $OR^1$, halogen or Z, U is halogen, $OR^1$ or $NR^1R^2$, and the other substituents are as defined under the formula I.

Examples of compounds of the formula (III) are

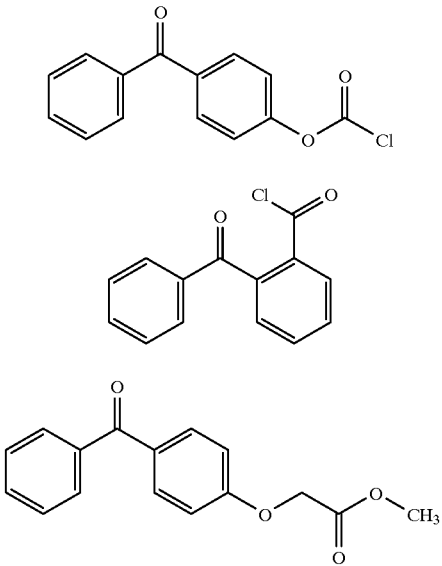

The reagent R is, for example, 2,4,6-trichloro-s-triazine (=cyanuric chloride), phosgene, alkyl bromoacetate, alkyl chloroacetate, methyl chloroformate, oxalic acid, oxalyl dihalide, dialkyl oxalate, oxalyl halide monoesters, ethylene oxide, thionyl chloride ($SOCl_2$), phosphorus(III) halide ($PCl_3$ or $PBr_3$), hydrogen halide (HCl or HBr) or elemental chlorine.

In a second step, the compound (III) is reacted with Z-H to give the novel compound (I). The reaction can also be carried out using the anion $Z^-$, which is preferably prepared from the compound Z-H (where Z is as defined under the formula I and H is hydrogen). If —X-T in the compound (II) is —C(O)$OR^1$, —C(O)$NR^1R^2$, or —C(O)—O—C(O)—$R^1$, the compound (II) can be reacted directly with Z-H or with the anion $Z^-$ to give the target compound (I).

Alternatively, it is possible first to react a 2,2,6,6-tetraalkylpiperidine derivative which is known from the literature, for example one of the compounds Z-H and Z-M, where M is, for example Na, K, etc., with a reagent U-Y-U to give the intermediate Z-Y-U, where Z and H are as defined above.

In this preparation variant, the compound Z-Y-U is reacted in a subsequent step with a suitably substituted derivative of benzophenone (compounds of the formula II where —XT=—OH or —SH) to give the novel compounds (I).

The reactions are carried out in a protic or aprotic, organic solvent, preferably in a hydrocarbon, in particular an aromatic hydrocarbon, such as, for example, toluene, xylene or a mixture thereof, or in tetrahydrofuran. Another possibility is to use one of the reaction components in excess as solvent.

The novel compounds are highly suitable for stabilizing organic material against the action of light, radiation, oxygen and heat. They are added to the organic material to be stabilized in a concentration of from 0.001 to 5% by weight, preferably from 0.02 to 1.0% by weight, based on the organic material, before, during or after the preparation thereof.

The term organic material is taken to mean, for example, precursors of plastics, surface coatings, paints and oils, but in particular plastics, surface coatings, paints and oils themselves.

The present invention also relates to organic materials, in particular plastics, surface coatings, paints and oils, which have been stabilized against the action of light, radiation, oxygen and heat and contain the novel compounds in the abovementioned concentrations. These organic materials include, for example, substances as described on pages 13–18 or European Patent Application 95 109 778.1-1270, which is expressly incorporated herein by way of reference.

The organic material stabilized by the novel compounds may, if desired, contain further additives, for example antioxidants, light stabilizers, metal deactivators, antistatics, flame inhibitors, pigments and fillers. Antioxidants and light stabilizers which are added in addition to the novel compounds are, for example, compounds based on sterically hindered amines or sterically hindered phenols or sulfur- or phosphorus-containing costabilizers. Examples of suitable additional additives are compounds as described on pages 18–29 of European Patent Application 95 109 778.1-1270, which is expressly incorporated herein byway of reference.

In addition, further suitable additives are the following: 2,2',2"-nitrilo[triethyl tris(3,3',5,5'-tetra-tert-butyl-1,1'-biphenyl-2,2'-diyl)phosphite], ethyl bis[2-methyl-4,6-bis(1,1-dimethylethyl)phenol]phosphite, secondary hydroxylamines, such as, for example, distearylhydroxylamine or dilaurylstearylamine, zeolites, such as, for example, DHT 4A, oxides and hydroxides of aluminum, zinc, alkali metals and alkaline earth metals, Al, Ca, Mg and Zn stearates, where particularly finely divided material is especially suitable for individual applications, the product of the condensation of N,N'-bis[(4,6-di(4-n-butylamino-2,2,6,6-tetramethylpiperid-4-yl)-1,3,5-triazin-2-yl]-3-aminopropylethylene-1,2-diamine and 2,4-dichloro-6-(4-n-butylamino-2,2,6,6-tetramethylpiperid-4-yl)-1,3,5-triazine, 1,3;2,4-di(benzylidene)-D-sorbitol, 1,3;2,4-di-(4-tolylidene)-D-sorbitol and 1,3;2,4-di(4-ethylbenzylidene)-D-sorbitol.

Another mixture constituent can be hydrotalcites, which can be described by the general formula

where
($M^{2+}$) is Mg, Ca, Sr, Ba, Zn, Pb, Sn or Ni,
($M^{3+}$) is Al, B orBi,
$A^n$ is an anion having a valency of n,
n is an integer from 1 to 4,
x has a value of from 0 to 0.5,
y has a value of from 0 to 2, and A is OH⁻, Cl³¹, Br⁻, I⁻, ClO₄⁻, CH₃COO⁻, C₆H₅COO⁻, CO₃²⁻, SO₄²⁻, (OOC—COO)²⁻, (CHOHCOO)₂²⁻, (CHOH)₄CH₂OHCOO—, C₂H₄(COO)₂²⁻, (CH₂COO)₂²⁻, CH₃CHOHCOO⁻, SiO₃²⁻, SiO₄⁴⁻, Fe(CN)₆³⁻, Fe(CN)₆⁴⁻, BO₃³⁻, PO₃³⁻, HPO₄²⁻.

Preference is given to hydrotalcites in which ($M^{2+}$) is ($Ca^{2+}$), ($Mg^{2+}$) or a mixture of ($Mg^{2+}$) and ($Zn^{2+}$); ($A^{n-}$) is $CO_3^{2-}$, $BO_3^{3-}$ or $PO_3^{3-}$.

It is furthermore possible to employ hydrotalcites which can be described by the formula $$[(M^{2+})_x (Al^{3+})_2(OH)_{2x+6nz} (A^{n-})_{2y}H_2O]$$

in which ($M^{2+}$) is $Mg^{2+}$ or $Zn^{2+}$, but more preferably $Mg^{2+}$, ($A^{n-}$) is an anion, in particular from the group consisting of $CO_3^{2-}$, $(OOC-COO)^{2-}$, OH⁻ and S²⁻, where n is the valency of the ion, y is a positive number, preferably between 0 and 5, in particular between 0.5 and 5;

x and z have positive values, where x should preferably be between 2 and 6 and z should preferably be less than 2.

Particular preference is given to the hydrotalcites of the following formulae:

$Al_2O_3.6MgO.CO_2.12H_2O$,
$Mg_{4.5}Al_2(OH)_{13}.CO_3.3.5H_2O$,
$4MgO.Al_2O_3.CO_2.9H_2O$,
$4MgO.Al_2O_3.CO_2.6H_2O$,
$ZnO.3MgO.Al_2O_3.CO_2.8-9H_2O$,
$ZnO.3MgO.Al_2O_3.CO_2.5-6H_2O$,
$Mg_{4.5}Al_2(OH)_{13}.CO_3$.

Hydrotalcites are preferably employed in the polymer in a concentration of from 0.01 to 5% by weight, in particular from 0.2 to 3% by weight, based on the entire polymer composition.

The additives are incorporated into the organic polymers by methods which are known in general terms, for example by mixing or applying the compounds and any further additives into or onto the polymer immediately after polymerization or into the melt before or during shaping. The incorporation can also be effected by applying the dissolved or dispersed compounds directly to the polymer or by mixing into a solution, suspension or emulsion of the polymer, if necessary with subsequent evaporation of the solvent. The compounds are also effective if introduced into a pregranulated polymer at a subsequent stage in a separate processing step. The novel compounds of the formula (I) can also be added to the polymers to be form of a master batch containing these compounds in, for example, of from 1 to 75% by weight, preferably from 2.5 to 30% by weight.

EXAMPLES

The examples below are intended to illustrate the invention in greater detail. All compounds were unambiguously identified from their ¹H— or ¹³C—NMR spectra. The origin of the starting materials is shown in the corresponding table. Examples 1 to 6:

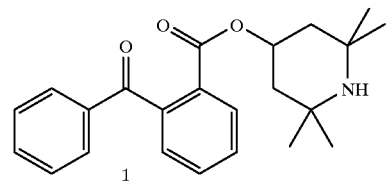

1

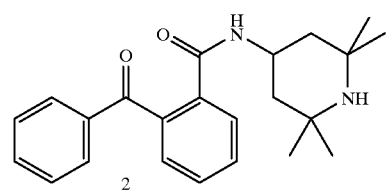

2

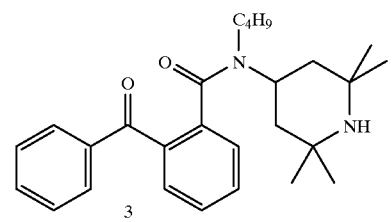

3

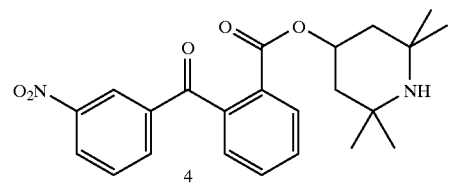

4

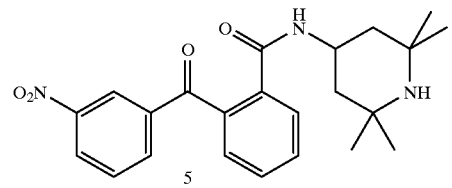

5

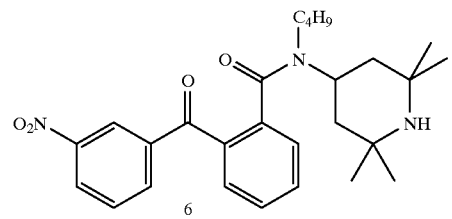

6

General procedure for the preparation of the compounds 1–6:

The reaction is carried out under nitrogen and with exclusion of air and water. 25–100 mmol of compound A, B or C (Table 1) and a 10% excess of triethylamine are precharged in 150 ml of toluene. An equimolar amount, based on A, B or C, of an acid chloride D or E is dissolved in 30 ml of toluene and added slowly to the precharged solution at 22° C. After the mixture has been stirred at 109° C. for 3 hours, a pale precipitate is formed. The reaction mixture is poured into water, and the precipitate dissolves. The organic phase is washed with water, dried using sodium sulfate and filtered off from the latter. The volatile constituents are removed in vacuo, and the residue is dried in vacuo at 80° C.

TABLE 1

| Compound No. | Starting material* | Amount NEt₃** | Acid chloride*** | Yield | Characterization | $\lambda_{max}$**** |
|---|---|---|---|---|---|---|
| 1 (M = 365.51) | A, 15.7 g (100 mmol) | 11.1 g (110 mmol) | D, 24.5 g (100 mmol) | 22.8 g (63%) | Pale yellow oil | 278 nm (vs) 325 nm (s) |
| 2 (M = 364.53) | B, 7.8 g (50 mmol) | 5.6 g (55 mmol) | D, 12.2 g (50 mmol) | 14.4 g (79%) | Yellow crystals M.p. = 200–201° C. | 255 nm (vs) 288 nm (s) |
| 3 (M = 420.65) | C, 21.2 g (100 mmol) | 11.1 g (110 mmol) | D, 24.5 g (100 mmol) | 39.6 g (94%) | Pale yellow oil | 254 nm (vs) 340 nm (s) |
| 4 (M = 410.51) | A, 7.2 g (46 mmol) | 5.1 g (50 mmol) | E, 13.3 g (46 mmol) | 15.3 g (81%) | White, waxy | 290 nm (vs) 350 nm (s) |
| 5 (M = 409.53) | B, 7.2 g (46 mmol) | 5.1 g (50 mmol) | E, 13.3 g (46 mmol) | 14.4 g (76%) | Yellow crystals M.p. = 216–218° C. | 257 nm (vs) 310 nm (s, sh) |
| 6 (M = 465.65) | C, 5.1 g (24 mmol) | 2.7 g (27 mmol) | E, 7.0 g (24 mmol) | 7.0 g (63%) | Pale yellow oil | 235 nm (vs) 270 nm (s) 340 nm (m, sh) |

A = 2,2,6,6-Tetramethylpiperidin-4-ol* (M = 157.29)
B = 2,2,6,6-Tetramethyl-4-piperidinamine* (M = 156.31)
C = N-Butyl-2,2,6,6-tetramethyl-4-piperidinamine* (M = 212.43)
D = Benzophenone-2-carbonyl chloride***, (M = 244.68)
E = 3-Nitrobenzophenone-2'-carbonyl chloride***,
M = Molecular weight; vs = very strong; s = strong; sh = shoulder; m = medium; w = weak
*Purchased from HÜLS AG, Marl.
**Purchased from Aldrich GmbH & Co KG, Steinheim.
***Product prepared ourselves by a common method (organic carboxylic acid reacted with SOCl₂);
The starting material for D is benzophenone-2-carboxylic acid**
The starting material for E is 3-nitrobenzophenone-2'-carboxylic acid, which was prepared by a common method (Houben-Weyl X/1, 471) (organic carboxylic acid, purchased from Aldrich GmbH & Co KG, Steinheim, reacted with nitrating acid).
****Measured in ethanol Intermediates 7 and 8:

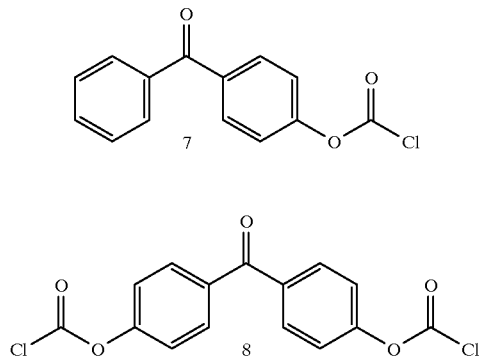

General procedure for the preparation of compounds 7 and 8:

About 50–120 mmol of compound F or G (cf. Table 2) and a slight excess of N,N-dimethylaniline are precharged in a mixture of 150 ml of toluene and 50 ml of tetrahydrofuran. A gentle stream of phosgene is passed through the solution at 50° C. for 16 hours. After the solution has been stirred at 80° C. for a further 2 hours, it is poured into water. The mixture is adjusted to pH 1 by means of 10% HCl, and 50 ml of methylene chloride are added. The organic phase is washed with 10% HCl, separated off, dried using sodium sulfate, filtered off from the latter and freed from solvent in vacuo. The chloroformate is isolated in the form of a pale, crystalline solid.

EXAMPLES 9–12:

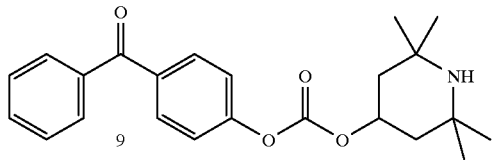

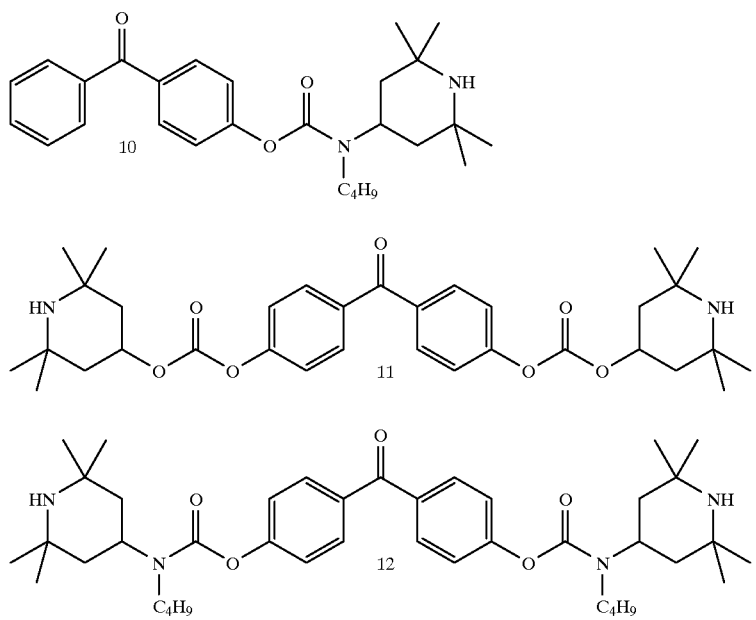

General procedure for the preparation of compounds 9–12:

20–60 mmol of compound A or C (cf. Table 2) and a slight excess of an amine are precharged in 150 ml of toluene. The chloroformate (7 or 8) is dissolved in 30 ml of toluene and added slowly to the precharged solution at 20° C. with ice cooling. After the reaction mixture has been stirred at 22° C. for 2 hours and at 107° C. for 1 hour, it is poured into water, and 50 ml of methylene chloride are added. The organic phase is washed with water, dried using sodium sulfate and filtered. The volatile constituents are removed in vacuo, and the residue is dried at 80° C. in vacuo.

TABLE 2

| Comp. No. | 1st starting material | 2nd starting material | Amine | Yield | Characterization | $\lambda_{max}$*** |
|---|---|---|---|---|---|---|
| 7 (M = 260.68) | F, 9.5 g (48 mmol) | — | H, 7.3 g (60 mmol) | 12.3 g (98%) | Pale green, cryst. M.p. = 64–66° C. | — |
| 8 (M = 339.14) | G, 25.0 g (117 mmol) | — | H, 30.5 g (252 mmol) | 33.4 g (84%) | Pale grey, cryst. M.p. = 106–108° C. | — |
| 9 (M = 381.51) | A, 6.3 g (40 mmol) | 7, 10.5 g (40 mmol) | I, 3.8 g (48 mmol) | 8.2 g (53%) | White, cryst. M.p. = 241–242° C. | 255 nm (vs) |
| 10 (M = 436.65) | C, 4.9 g (23 mmol) | 7, 6.0 g (23 mmol) | J, 2.6 g (26 mmol) | 7.3 g (74%) | Yellow oil | 258 nm (vs) |
| 11 (M = 580.80) | A, 9.9 g (63 mmol) | 8, 10.2 g (30 mmol) | J, 6.7 g (66 mmol) | 10.1 g (57%) | Amber-colored oil | 265 nm (vs) |
| 12 (M = 691.07) | C, 13.4 g (63 mmol) | 8, 8.4 g (25 mmol) | J, 6.7 g (66 mmol) | 10.5 g (60%) | Amber-colored oil | 262 nm (vs) |

A = 2,2,6,6-tetramethylpiperidin-4-ol** (M = 157.29)
B = N-butyl-2,2,6,6-tetramethyl-4-piperidinamine** (M = 212.43)
C = N-butyl-2,2,6,6-tetramethyl-4-piperidinamine* (M = 212.43)
F = 4-hydroxybenzophenone*
G = 4,4'-dihydroxybenzophenone*
H = N,N-dimethylaniline*
I = pyridine*
J = triethylamine*
*Purchased from Aldrich GmbH & Co KG, Steinheim.
**Purchased from HÜLS AG, Marl.
***Measured in ethanol Intermediates 13–19:

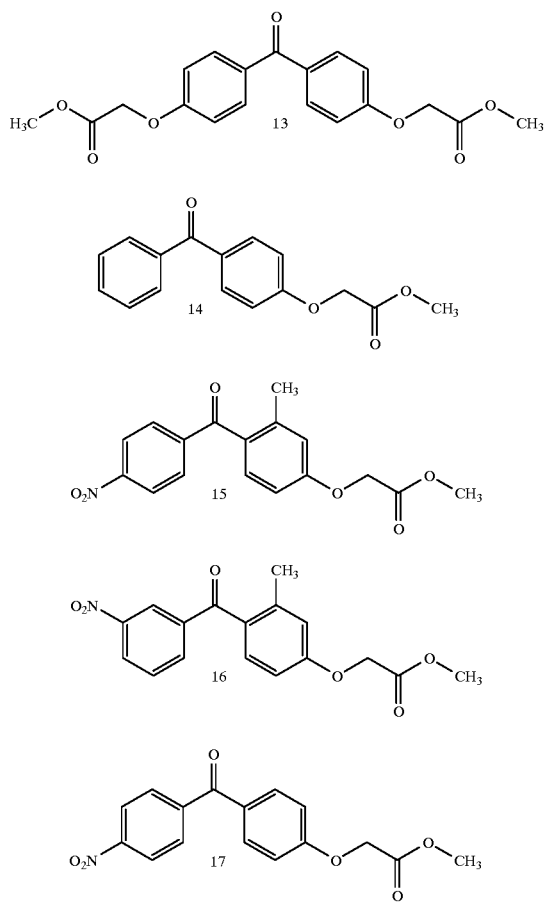

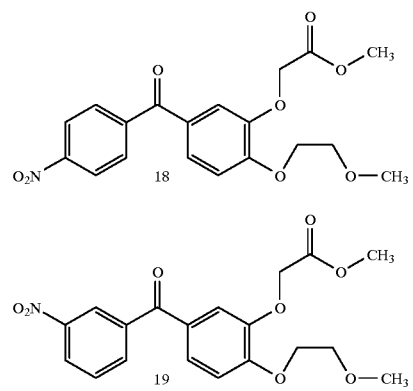

General procedure for the preparation of intermediates 13–19:

The reaction is carried out under nitrogen and with exclusion of air and water. 40–100 mmol of compounds K–Q (cf. Table 3) are precharged in 100 ml of anhydrous tetrahydrofuran. A 10% excess of sodium hydride (80% in paraffin) is added in portions at 20° C., during which the solution foams slightly and a precipitate is formed. Stirring is continued for 0.5 h, the operation is ended, and an equimolar amount of methyl bromoacetate is added slowly. After the mixture has been stirred at 66° C. for a further 8 hours, the color of the suspension has become significantly paler. The volatile constituents are removed in vacuo, 50 ml of methylene chloride are added to the residue, and the mixture is washed by shaking three times with 50 ml of water in each case. The organic phase is dried using sodium sulfate and filtered off from the latter, and the volatile constituents are removed in vacuo.

TABLE 3

| Experiment No. | Starting material | NaH (80% in paraffin)* | Methyl bromoacetate* | Yield | Characterization |
|---|---|---|---|---|---|
| 13 (M = 358.4) | K, 17.1 g (80 mmol) | 5.3 g (176 mmol) | 25.7 g (168 mmol) | 26.1 g (91%) | Colorless, cryst. M.p. = 178–179° C. |
| 14 (M = 270.3) | L, 19.8 g (100 mmol) | 3.3 g (111 mmol) | 16.1 g (105 mmol) | 23.7 g (88%) | Yellow, crystalline M.p. = 99–101° C. |
| 15 (M = 327.3) | M, 15.4 g (60 mmol) | 2.0 g (66 mmol) | 9.2 g (60 mmol) | 13.5 g (68%) | Beige, Crystalline M.p. = 132–133° C. |
| 16 (M = 329.3) | N, 25.7 g (100 mmol) | 3.3 g (110 mmol) | 15.3 g (100 mmol) | 25.3 g (77%) | Brown oil, pure acc. to $^1$H NMR |
| 17 (M = 315.1) | O, 24.3 g (100 mmol) | 3.3 g (110 mmol) | 15.3 g (100 mmol) | 20.0 g (63%) | Pale yellow, cryst. M.p. = 136° C. |
| 18 (M = 403.4) | P, 25.9 g (100 mmol) | 6.2 g (220 mmol) | 30.6 g (200 mmol) | 32.3 g (80%) | Golden yellow, cryst. M.p. = 149–150° C. |

TABLE 3-continued

| Experiment No. | Starting material | NaH (80% in paraffin)* | Methyl bromoacetate* | Yield | Characterization |
|---|---|---|---|---|---|
| 19 (M = 403.4) | Q, 11.7 g (45 mmol) | 3.0 g (100 mmol) | 13.8 g (90 mmol) | 15.9 g (88%) | Golden yellow oil pure acc. to ¹H NMR |

K = 4,4'-dihydroxybenzophenone*
L = 4-hydroxybenzophenone*
M = 2-methyl-4-hydroxy-4'-nitrobenzophenone**
N = 2-methyl-4-hydroxy-3'-nitrobenzophenone**
O = 4-hydroxy-4'-nitrobenzophenone**
P = 3,4-dihydroxy-4'-nitrobenzophenone**
Q = 3,4-dihydroxy-3'-nitrobenzophenone**
*Purchased from Aldrich GmbH & Co KG, Steinheim.
**Prepared ourselves by a common method (Friedel-Crafts-Acylation) as described in Houben-Weyl Vll/2a, 15)

EXAMPLES 20–26:

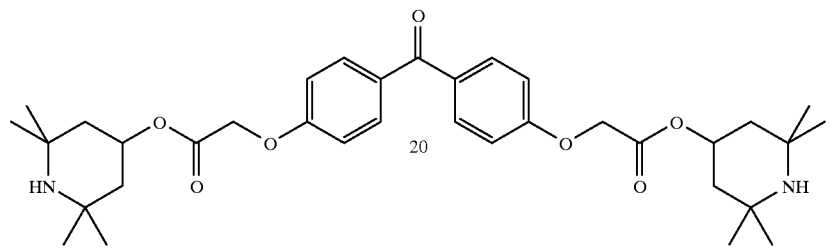

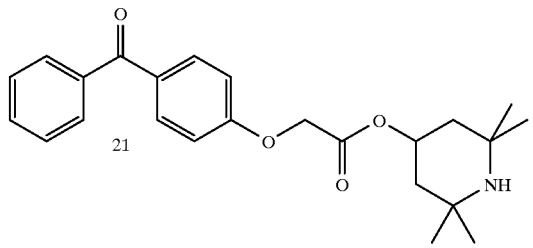

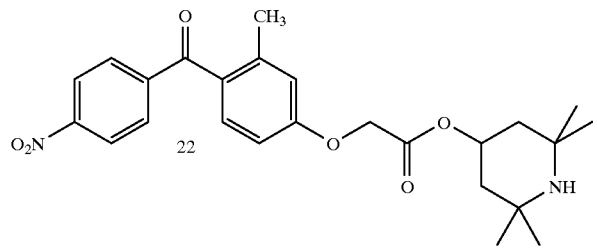

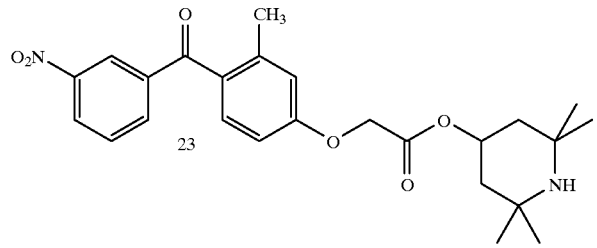

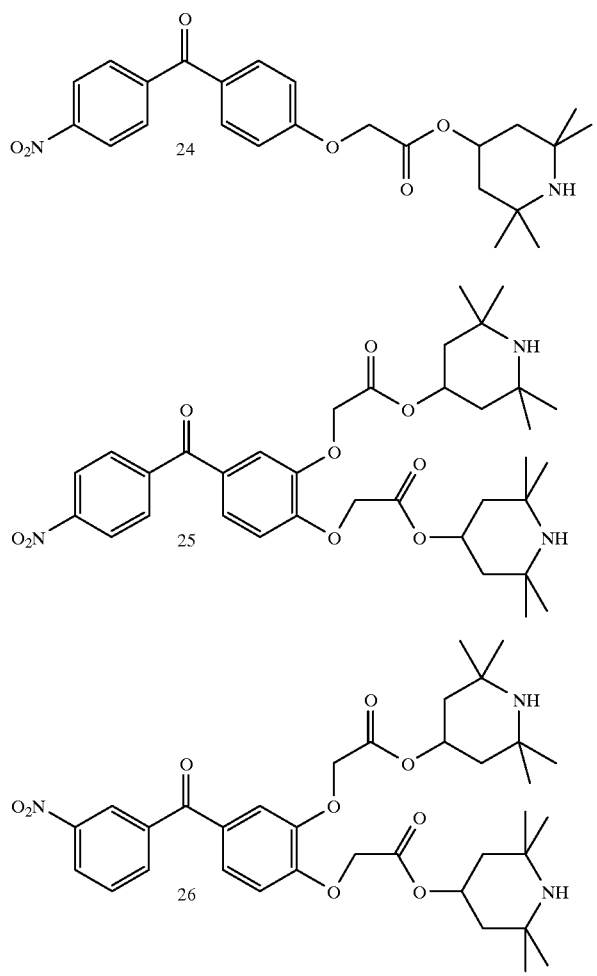

General procedure for the preparation of compounds 20–26:

20–40 mmol of the methyl ester described (13–19), are stirred for 8 hours at 135° C. with an equimolar amount of 2,2,6,6-tetramethylpiperidin-4-ol (cf. Table 4) and 200 mg of lithium amide (9 mmol) in 200 ml of xylene, during which the methanol which slowly forms is slowly distilled off continuously together with a little xylene. The mixture is cooled and poured into water. The organic phase is washed three times with 50 ml of water in each case, dried using sodium sulfate and filtered off from the latter. The volatile constituents are removed in vacuo, and the product is dried at 80° C. in vacuo.

TABLE 4

| Experiment No. | 1st starting material | 2nd starting material* | Yield | Characterization | $\lambda_{max}$** |
|---|---|---|---|---|---|
| 20 (M = 608.90) | 13, 9.0 g (25 mmol) | 7.9 g (50 mmol) | 15.0 g (99%) | Colorless, cryst. M.p. = 125–128° C. | 286 nm (vs) 330 nm (m, sh) |
| 21 (M = 395.54) | 14, 18.8 g (40 mmol) | 6.3 g (40 mmol) | 14.9 g (95%) | Pale yellow, cryst. M.p. = 79–80° C. | 284 nm (vs) 340 (m, sh) |
| 22 (M = 453.56)) | 15, 13.1 g (40 mmol) | 6.3 g (40 mmol) | 13.6 g (75%) | Pale yellow, cryst. M.p. = 99–101° C. | 266 nm (vs) 305 nm (s, sh) |
| 23 (M = 454.57) | 16, 13.2 g (40 mmol) | 6.3 g (40 mmol) | 15.3 g (84%) | Orange oil, pure acc. to $^1$H NMR | 272, 290 nm (vs) 350 nm (s) |

TABLE 4-continued

| Experiment No. | 1st starting material | 2nd starting material* | Yield | Characterization | $\lambda_{max}$** |
|---|---|---|---|---|---|
| 24 (M = 440.54)) | 17, 12.6 g (40 mmol) | 6.3 g (40 mmol) | 16.0 g (91%) | Yellow, crystalline M.p. = 125–126° C. | 275 nm (vs) 295 nm (s, sh) |
| 25 (M = 653.85) | 18, 10.1 g (25 mmol) | 7.9 g (50 mmol) | 13.8 g (84%) | Beige, crystalline M.p. = 128–131° C. | 278, 320 nm (vs) 450 nm (w, sh) |
| 26 (M = 653.85) | 19, 14.5 g (36 mmol) | 11.3 g (72 mmol) | 5.3 g (22%) | Brown oil, pure acc. to $^1$H NMR | 275, nm (vs) 310 nm (s) |

*2,2,6,6-Tetramethylpiperidin-4-ol, purchased from HÜLS AG, Marl.
**Compounds 20 and 21 were measured in ethanol, Compounds 22, 24, 25 were measured in DMSO, and Compounds 23 and 26 were measured in $CHCl_3$.

Example 27: Light-Stabilizing Action in Polypropylene Films 100 parts per weight of unstabilized polypropylene ®Hostalen PPK were compounded for 10 minutes at 200° C. and 20 rpm in a Brabender mixer together with 0.1 part by weight of calcium stearate, 0.05 part by weight of pentaerythrityl tetrakis[3-(3,5-di-t-butyl-4-hydroxyphenyl)propionate] and 0.1 part by weight of the stabilizer to be tested. A film with a thickness of 100 μm was pressed from this mixture at 190° C., and the test specimens obtained in this way were exposed for 500 hours in a weathering apparatus (®Xenotest 1200). The criterion used for the stability of the film was the change in the carbonyl index over this period. The carbonyl index CO was determined here from the formula $CO=E_{1720}/E_{2020}$ (E is the absorbance at the particular wavelength). For comparative purposes, a film was tested under the same conditions, but without addition of a novel stabilizer. The experimental results are shown in Table 5:

TABLE 5

Increase in the carbonyl index after exposure for 500 hours:

| Stabilizer | Δ(CO) |
|---|---|
| Bis(2,2,6,6-tetramethyl-4-piperidyl) sebacate | 0.02 |
| from Example 20 | 0.20 |
| from Example 25 | 0.23 |
| None | (400 h:2.0)* |

*After only 400 hours, the film begins to embrittle to such an extent that the experiment has to be terminated.

Table 5 underlines the very good light stability of polypropylene stabilized in accordance with the invention compared with unstabilized polypropylene, with virtually the light stability of propylene stabilized with bis(2,2,6,6-tetramethyl-4-piperidyl) sebacate being achieved.

Example 28: Light-Stabilizing Action in Polypropylene Films With Extraction 100 parts per weight of unstabilized polypropylene ®Hostalen PPK were compounded for 10 minutes at 200° C. and 20 rpm in a Brabender mixer together with 0.1 part by weight of calcium stearate, 0.05 part by weight of pentaerythrityl tetrakis[3-(3,5-di-t-butyl-4-hydroxyphenyl)propionate] and 0.1 part by weight of the stabilizer to be tested. A film with a thickness of 100 μm was pressed from this mixture at 190° C., and the test specimens obtained in this way were exposed for 200 hours in a weathering apparatus (®Xenotest 1200). After this pre-exposure, the film pieces were extracted with methylene chloride (24 hours, 40° C.) and then exposed for a further 300 hours. The criterion used for the stability of the film was the change in the carbonyl index over this period (total exposure time of 500 hours). The carbonyl index CO was determined here from the formula $CO=E_{1720}/E_{2020}$. For comparative purposes, a film was tested under the same conditions, but without addition of a novel stabilizer. The experimental results are shown in Table 6:

TABLE 6

Increase in the carbonyl index after pre-exposure for 200 hours, extraction with methylene chloride (24 hours, 40° C.) and further exposure for 300 hours (gives a total exposure time of 500 hours):

| Stabilizer | Δ(CO) |
|---|---|
| Bis(2,2,6,6-tetramethyl-4-piperidyl) sebacate | 1.08 |
| from Example 20 | 0.72 |
| from Example 25 | 0.86 |
| None | (400 h:2.0)* |

*After 400 hours (pre-exposure for 200 hours + further exposure for 200 hours), the film begins to embrittle to such an extent that the experiment has to be terminated.

Table 6 shows that the light-stabilization action of the stabilizers prepared in accordance with the invention is retained even after extraction with methylene chloride and is better than bis(2,2,6,6-tetramethyl-4-piperidyl)sebacate.

Example 29: Extraction Behaviour of the Stabilizers in Polypropylene Films After Exposure Test specimens produced analogously to Example 27 were exposed for 200 hours in a weathering apparatus (®Xenotest 1200). The test specimens were then subjected to hot extraction with methylene chloride, and the inextractable residual stabilizer content remaining in the film was determined by nitrogen determination (by the chemiluminescence method). Before commencement of the exposure, the majority of the stabilizer was extractable from the test specimens using methylene chloride under the extraction conditions used. The experimental results are shown in Table 7.

TABLE 7

Exhaustive hot extraction of the PP films with methylene chloride after pre-exposure for 200 hours

| Stabilizer Inextractable | Amount in the film at the beginning [%] | Amount after exposure for 200 hours and extraction* [%] | amount of stabilizer |
|---|---|---|---|
| Comparison | 0.1 | 0.028 | 28% |
| Compound 1 | 0.1 | 0.067 | 67% |
| Compound 6 | 0.1 | 0.058 | 58% |
| Compound 20 | 0.1 | 0.071 | 71% |
| Compound 22 | 0.1 | 0.061 | 61% |
| Compound 25 | 0.1 | 0.067 | 67% |

Comparison = Bis(2,2,6,6-tetramethyl-4-piperidyl) sebacate
*Extraction with methylene chloride (24 hours, 40° C.)

The novel stabilizers are much less extractable with methylene chloride after exposure for 200 hours than before the exposure owing to the change in the molecular weight which occurs during this exposure. The comparative experiment shows that the stabilizers of the prior art can be extracted virtually completely.

We claim:

1. A UV stabilizer of the formula (I)

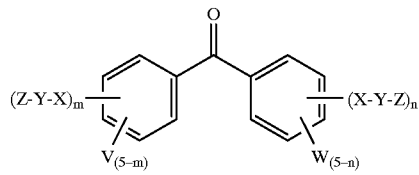

in which the substituent in the α-position to the carbonyl group on the aromatic ring is not OH, m and n, independently of one another, are 0, 1 or 2, with the proviso that both m and n can not be 0 simultaneously, V and W, independently of one another, are H, Hal, $NO_2$, OH, $OR^1$, CN, $SR^1$, $C_1$–$C_{18}$-alkyl, $C_3$–$C_{10}$-cycloalkyl, $C_6$–$C_{14}$-aryl or $C_7$–$C_{10}$-arylalkyl, each of which is unsubstituted or substituted by OH, $OR^1$, Hal or $NR^1R^2$, a heteroaromatic radical having 5–15 carbon atoms, $NR^1R^2$ or $COOR^1$, $R^1$ and $R^2$ are H, $C_1$–$C_{18}$-alkyl, $C_3$–$C_{10}$-cycloalkyl., $C_6$–$C_{14}$-aryl or $C_7$–$C_{10}$-arylalkyl, each of which is unsubstituted or substituted by OH, $OR^1$, or Hal, or a heteroaromatic radical having 5–15 carbon atoms, X is a divalent radical —C(O)—.

Y, where X=—C(O)—, is a direct bond to Z,

Z is one of the following radicals:

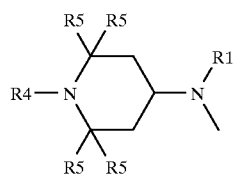

$R_C$

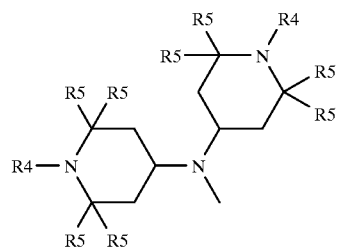

$R_D$

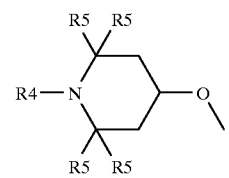

$R_E$

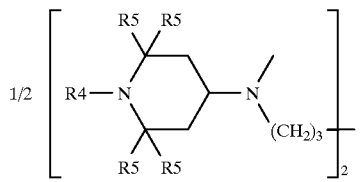

$R_F$ in which $R^4$ is hydrogen, $C_1$–$C_{20}$-alkyl, an oxygen radical, OH, NO, $CH_2CN$, $C_6$–$C_{14}$-aryl or $C_7$–$C_{10}$-arylalkyl, each of which is unsubstituted or substituted by OH, $OR^1$, Hal or $NR^1R^2$, allyl, $C_1$–$C_{30}$-alkoxy, $C_5$–$C_{12}$-cycloalkoxy, $C_3$–$C_{10}$-alkenyl, $C_3$–$C_6$-alkynyl, $C_1$–$C_4$acyl or halogen, and $R^5$ is hydrogen or $C_1$–$C_4$-alkyl, whose rate of migration in or extractability from organic materials is significantly reduced through exposure to UV light.

2. A stabilizer as claimed in claim 1, wherein the substituent in the a-position to the carbonyl group on the aromatic ring is not OH, V and W, independently of one another, are H, $NO_2$, OH, $C_1$–$C_{10}$-alkyl, $C_5$–$C_6$-cycloalkyl, $C_6$–$C_{14}$-aryl or $C_7$–$C_{10}$-arylalkyl, each of which is unsubstituted or substituted by OH or $NR^1R^2$, a heteroaromatic radical having 6–10 carbon atoms, $NR^1R^2$ or $COOR^1$, $R^1$ and $R^2$ are H, $C_1$–$C_{10}$-alkyl, $C_5$–$C_6$-cycloalkyl, $C_6$–$C_{14}$-aryl or $C_7$–$C_{10}$-arylalkyl, each of which is unsubstituted or substituted by OH, or a heteroaromatic radical having 6–10 carbon atoms, Z is the radical $R_C$, $R_D$ or $R_E$, in which $R^4$ is hydrogen, $C_1$–$C_{10}$-alkyl, an oxygen radical, OH, NO, $C_6$–$C_{14}$-aryl or $C_7$–$C_{10}$-arylalkyl, each of which is unsubstituted or substituted by OH or $NR^1R^2$, allyl, $C_1$–$C_{10}$-alkyloxy, $C_6$–$C_9$-cycloalkyloxy, $C_4$–$C_8$-alkenyl, $C_3$–$C_6$-alkynyl, $C_1$–$C_5$-acyl or halogen, and $R^5$ is hydrogen or $C_1$–$C_4$-alkyl.

3. A stabilizer as claimed in claim 1, wherein the subsituent in the α-position to the carbonyl group on the aromatic ring is not OH, V and W, independently of one another, are H, $NO_2$, $C_1$–$C_4$-alkyl, $NR^1R^2$ or $COOR^1$, $R^1$ and $R^2$ are H, $C_1$–$C_4$-alkyl, $C_6$–$C_{14}$-aryl or $C_7$–$C_{10}$-arylalkyl, each of which is unsubstituted or substituted by OH, Z is a radical of the formula $R_C$ or $R_E$, in which $R^4$ is hydrogen, OH, NO, $C_1$–$C_5$-alkyl, $C_1$–$C_5$-alkoxy, or $C_1$–$C_5$-acyl, and $R^5$ is methyl.

4. A process for the preparation of a compound of the formula (I) as claimed in claim 1, which comprises converting a benzophenone (II) into a reactive molecule (III) using one or more equivalents of a suitable reagent R:

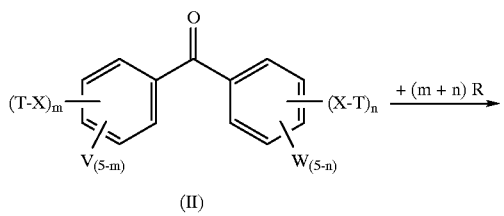

(II)

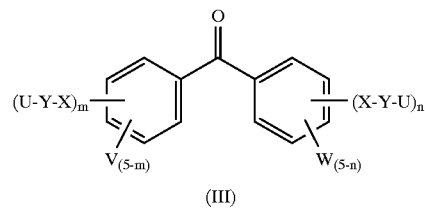

(III)

where

V, W, X, and Y are as defined under the formula (I),

T, where X=—C(O)—, is $OR^1$, $NR^1R^2$, —O—(CO)—$R^1$ or OH,

R is U-Y-U, thionyl chloride, phosphorous (III) halide, hydrogen halide or elemental chlorine, where U is hydrogen, halogen, $OR^1$ or $NR^1R^2$, and in a second step, reacting the compound (III) with Z-H to give the novel compound (I), where H is hydrogen and Z is as defined in claim 1.

5. A process as claimed in claim 4, wherein the reagent R is 2,4,6-trichloro-s-triazine, phosgene, alkyl bromoacetate, alkyl chloroacetate, methyl chloroformate, oxalic acid, oxalyl dihalide, dialkyl oxalate, oxalyl halide monoester, ethylene oxide, thionyl chloride, phosphorus(III) halide, hydrogen halide or elemental chlorine.

6. The process as claimed in claim 4, wherein the reaction is carried out in a protic or aprotic organic solvent.

7. The process as claimed in claim 4, wherein one of the reaction components is used in excess as solvent.

8. A stabilizer as claimed in claim 1, wherein the substituents on the aromatic ring which are in the α-position with respect to the carbonyl group of formula (I) are not OH.

9. The process as claimed in claim 6, wherein the organic solvent is a hydrocarbon or is tetrahydrofuran.

10. The process as claimed in claim 9, wherein the hydrocarbon is aromatic.

* * * * *